United States Patent
Inoue et al.

(10) Patent No.: US 8,283,888 B2
(45) Date of Patent: Oct. 9, 2012

(54) POWER RECEIVER, AND ELECTRONIC APPARATUS AND NON-CONTACT CHARGER USING SAME

(75) Inventors: Tetsuo Inoue, Yokohama (JP); Takao Kusaka, Yokohama (JP); Masaharu Suzuki, Sagamihara (JP)

(73) Assignees: Kabushiki Kaisha Toshiba, Tokyo (JP); Toshiba Materials Co., Ltd., Yokohama-shi (JP)

( * ) Notice: Subject to any disclaimer, the term of this patent is extended or adjusted under 35 U.S.C. 154(b) by 500 days.

(21) Appl. No.: 12/160,544

(22) PCT Filed: Jan. 9, 2007

(86) PCT No.: PCT/JP2007/000004
§ 371 (c)(1),
(2), (4) Date: Aug. 22, 2008

(87) PCT Pub. No.: WO2007/080820
PCT Pub. Date: Jul. 19, 2007

(65) Prior Publication Data
US 2010/0156344 A1 Jun. 24, 2010

(30) Foreign Application Priority Data
Jan. 12, 2006 (JP) ................. P2006-005073

(51) Int. Cl.
*H02J 7/00* (2006.01)
(52) U.S. Cl. ..................... 320/108; 320/112
(58) Field of Classification Search ............ 320/108
See application file for complete search history.

(56) References Cited

U.S. PATENT DOCUMENTS

| | | | |
|---|---|---|---|
| 5,600,225 A * | 2/1997 | Goto | 320/108 |
| 5,656,983 A | 8/1997 | Ito et al. | |
| 5,719,546 A * | 2/1998 | Ito et al. | 336/180 |
| 6,207,303 B1 * | 3/2001 | Tomita | 428/812 |
| 6,324,431 B1 * | 11/2001 | Zarinetchi et al. | 607/61 |
| 6,661,197 B2 * | 12/2003 | Zink et al. | 320/108 |
| 6,962,833 B2 * | 11/2005 | Tuttle et al. | 438/55 |

FOREIGN PATENT DOCUMENTS

| | | |
|---|---|---|
| JP | 52-153035 U | 11/1977 |
| JP | 6-163273 A | 6/1994 |
| JP | 08-079976 A | 3/1996 |
| JP | 9-190938 A | 7/1997 |
| JP | 11-031614 A | 2/1999 |
| JP | 11-176677 A | 7/1999 |
| JP | 11-265814 A | 9/1999 |
| JP | 2000-023393 A | 1/2000 |
| JP | 2003-257751 A | 9/2003 |
| WO | WO 00/01442 A2 | 1/2000 |

OTHER PUBLICATIONS

Australian Official Journal of Patents, AU-A-50905/99, Apr. 6, 2000, p. 1605.

* cited by examiner

*Primary Examiner* — Drew A Dunn
*Assistant Examiner* — Robert Grant
(74) *Attorney, Agent, or Firm* — Foley & Lardner LLP

(57) ABSTRACT

An electronic apparatus (1) includes a power receiver (2) and an electronic apparatus main body (3). The power receiver (2) includes a power receiving coil (11) having a spiral coil, a rectifier (12) and a secondary battery (13). The electronic apparatus main body (3) includes an electronic device (14) and a circuit board (15). A magnetic foil (16) is arranged in at least one position between the spiral coil (11) and one of the secondary battery (13), the rectifier (12), the electronic device (14) and the circuit board (15).

16 Claims, 8 Drawing Sheets

POWER RECEIVER, AND ELECTRONIC APPARATUS AND NON-CONTACT CHARGER USING SAME

TECHNICAL FIELD

The present invention relates to a power receiver which is applied to non-contact charging, and an electronic apparatus and a non-contact charger using the same.

BACKGROUND ART

The development of portable telecommunications equipment is remarkable in these years, and especially cellular phones are being made smaller and lighter quickly. In addition to the cellular phones, electronic apparatuses such as video cameras (handy cameras etc.), cordless telephones, laptop personal computers (notebook personal computers) and the like are also being made smaller and lighter. They have a secondary battery provided within an electronic apparatus main body so as to be usable without connection to a wall outlet. Thus, their portability and usability are enhanced. At present, the capacity of the secondary battery is limited, and it is required to recharge once per several days to several weeks.

Recharging methods include a contact charging method and a non-contact charging method. The contact charging method performs charging with an electrode of a power receiver directly contacted with an electrode of a power feeder. The contact charging method is generally used because its apparatus has a simple structure. But, the weight of the electronic apparatus has been reduced with the downsizing and weight reduction of the electronic apparatus in these years, and the contact pressure between the electrode of the power receiver and the electrode of the power feeder becomes insufficient, causing a problem of defective charging. In addition, since the secondary battery is weak against heat, it is necessary to design a circuit so that the secondary battery is not overdischarged or overcharged in order to prevent the battery from increasing its temperature. Under the circumstances described above, the application of the non-contact charging method is being studied.

The non-contact charging method provides a coil to both the power receiver and the power feeder and performs charging by electromagnetic induction. The non-contact charging method does not need to consider a contact pressure between the electrodes. Therefore, a charging voltage can be fed stably without being influenced by the contact state of the electrodes. As a coil for the non-contact charger, a structure that a coil is wound around a ferrite core is known (see Patent References 1, 2). A structure that a coil is mounted on a resin substrate having a ferrite powder and a amorphous powder mixed is also known (see Patent Reference 3). But, the ferrite becomes brittle and has poor impact resistance when it is fabricated into a thin form, and the power receiver tends to have a malfunction if equipment is dropped.

Besides, to provide a thin power receiving portion in correspondence with the thinning of the equipment, it is considered to adopt a planar coil that is formed with a metal powder paste printed in a spiral form on a substrate. But, magnetic flux passing through the planar coil is interlinked with the substrate and the like within the equipment, so that there is a problem that heat is produced within the device because of an eddy current generated by the electromagnetic induction. Therefore, high electric power cannot be transmitted, and a charging time becomes long as a result. Specifically, when a contact charger is used to recharge a cellular phone, it takes about 90 minutes, while the non-contact charger takes about 120 minutes.

As described above, the power receiver applying the conventional non-contact charging method fails to take sufficient measures against the eddy current generated by the electromagnetic induction. Especially, since the power receiver is provided with the secondary battery, it is required to suppress the heat generation as much as possible. Besides, since the power receiver is attached to the electronic apparatus main body, the heat generation has an adverse effect on the circuit parts and the like. Therefore, high electric power cannot be transmitted when charging, resulting in a problem of having a long charging time. The generation of the eddy current also induces the generation of noise, becoming a factor for degrading the charging efficiency.

[Patent Reference 1] JP-A 11-265814(KOKAI)
[Patent Reference 2] JP-A 2000-23393(KOKAI)
[Patent Reference 3] JP-A 9-190938(KOKAI)

SUMMARY OF THE INVENTION

According to an aspect of the present invention, there are provided a power receiver which can suppress heat generation and a decrease in charging efficiency due to eddy current by suppressing the eddy current generated in the power receiving side by electromagnetic induction, and an electronic apparatus and a non-contact charger using the same.

A power receiver according to an aspect of the present invention includes: a power receiving coil having a spiral coil; a rectifier for rectifying an AC voltage generated in the power receiving coil; a secondary battery to which a DC voltage rectified by the rectifier is charged; and a magnetic foil arranged in at least one position between the spiral coil and the secondary battery and between the spiral coil and the rectifier.

An electronic apparatus according to an aspect of the present invention includes: a power receiver which is provided with a power receiving coil having a spiral coil, a rectifier for rectifying an AC voltage generated in the power receiving coil, and a secondary battery to which a DC voltage rectified by the rectifier is charged; an electronic apparatus main body which is provided with an electronic device operated by the DC voltage supplied from the secondary battery and a circuit board on which the electronic device is mounted; and a magnetic foil which is arranged in at least one position between the spiral coil and the secondary battery, between the spiral coil and the rectifier, between the spiral coil and the electronic device, and between the spiral coil and the circuit board.

A non-contact charger according to an aspect of the present invention includes: the electronic apparatus according to the aspect of the invention; and a power feeder which is provided with a power supplying coil disposed in non-contact with the power receiving coil of the electronic apparatus, and a power supply for supplying an AC voltage to the power supplying coil, wherein a magnetic flux generated in the power supplying coil is transmitted to the power receiving coil to transmit electric power in a non-contact state.

EXPLANATION OF REFERENCE NUMERALS

1: Electronic apparatus, 2: power receiver, 3: electronic apparatus main body, 4: housing, 11: spiral coil (power receiving coil), 12: rectifier, 13: secondary battery, 14: electronic device, 15: circuit board, 16: magnetic foil, 16a: bent portion, 16b: open portion, 17: slit, 20: non-contact charger, 30: power feeder, 31: power supplying coil, 32: magnetic core, 33: power supply.

MODE FOR CARRYING OUT THE INVENTION

Figure 1:
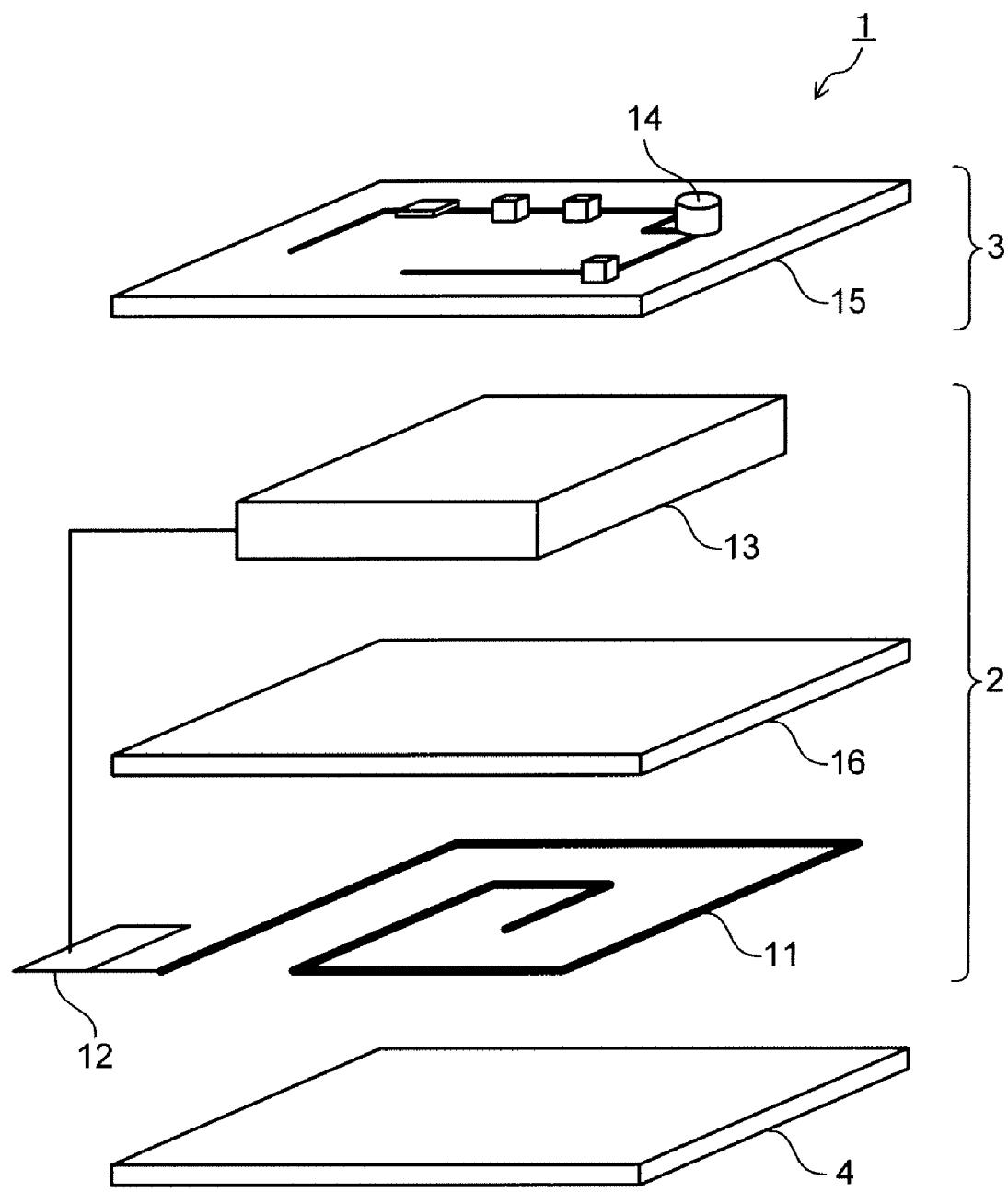
FIG. 1 is a diagram showing a structure of the electronic apparatus according to a first embodiment of the present invention.
Figure 2:
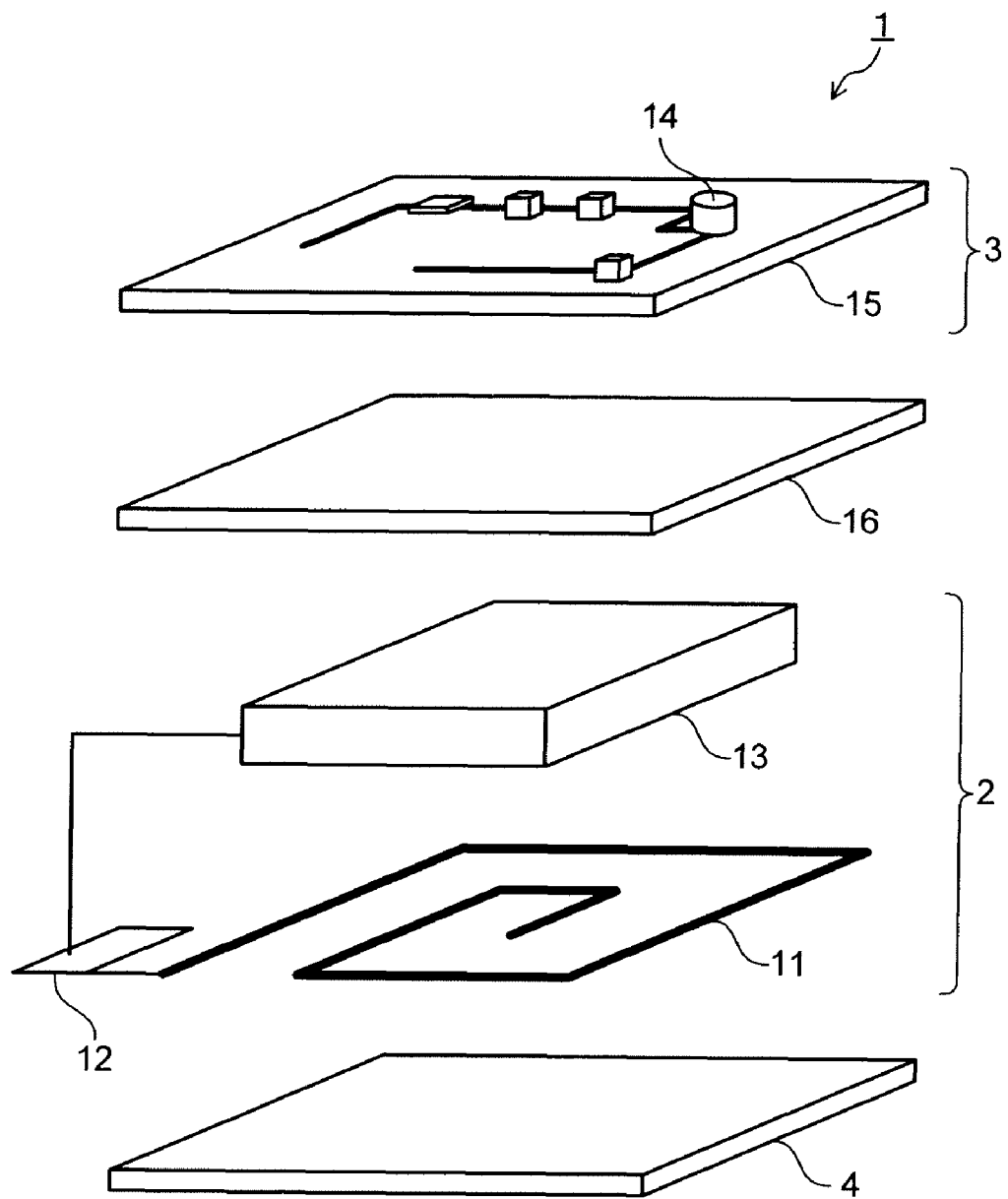
FIG. 2 is a diagram showing a structure of a modified example of the electronic apparatus shown in FIG. 1.

Modes of conducting the present invention will be described below with reference to the drawings. FIG. 1 and FIG. 2 show structures of electronic apparatuses according to a first embodiment of the present invention. An electronic apparatus 1 shown in FIG. 1 and FIG. 2 is provided with a power receiver 2 applying a non-contact charging method and an electronic apparatus main body 3. The power receiver 2 and the electronic apparatus main body 3 are arranged in a housing 4, thereby configuring the electronic apparatus 1.

The power receiver 2 is provided with a power receiving coil 11 having a spiral coil, a rectifier 12 for rectifying an AC voltage generated in the power receiving coil 11, and a secondary battery 13 into which the DC voltage rectified by the rectifier 12 is charged. The electronic apparatus main body 3 is provided with an electronic device 14, which is operated by feeding the DC voltage charged into the secondary battery 13 of the power receiver 2, and a circuit board 15 on which the electronic device 14 is mounted. The electronic apparatus main body 3 may be provided with parts and devices depending on the functions and operations of the electronic apparatus 1 in addition to the electronic device 14 and the circuit board 15.

As the spiral coil configuring the power receiving coil 11, a planar coil which has a metal wire such as a copper wire or the like wound in a flat state, a planar coil which has a metal powder paste formed by printing into a spiral form, or the like is used. The winding shape of the spiral coil is not limited to a particular shape such as circular, oval, square, polygon or the like. The winding number of the spiral coil is also determined appropriately according to the required properties.

The rectifier 12 includes semiconductor elements such as transistors, diodes and the like. The number of the rectifier 12 is arbitrary, and one or two or more rectifiers 12 are used, if necessary. The rectifier 12 may be a TFT or the like formed by a film forming technology. In FIG. 1 and FIG. 2, the rectifier 12 is provided on the side of the power receiving coil 11 of the circuit board 15. The rectifier 12 may be disposed on the opposite side of the power receiving coil 11 of the circuit board 15. The secondary battery 13 can be charged/discharged and used in a variety of forms such as a plate type, a button type and the like.

The electronic device 14 includes various types of elements and parts configuring the circuit, such as a resistance element, a capacitance element, an inductance element, a control element, a storage element, etc. In addition, other parts and devices are also included. The circuit board 15 has a circuit formed on the surface and inside of an insulation substrate such as a resin substrate, a ceramics substrate or the like. The electronic device 14 is mounted on the circuit board 15. The electronic device 14 may not be mounted on the circuit board 15.

The electronic apparatus 1 of the first embodiment is provided with a magnetic foil 16 which is arranged between the spiral coil (power receiving coil) 11 and the secondary battery 13 as shown in, for example, FIG. 1. In other words, the spiral coil 11 and the secondary battery 13 are disposed with the magnetic foil 16 sandwiched between them. The spiral coil 11 has a planar portion as at least a part of it, and the planar portion is disposed along a surface of the magnetic foil 16. When considered as the power receiver 2, the magnetic foil 16 is arranged between the spiral coil 11 and the secondary battery 13 configuring it.

The magnetic foil 16 may be arranged between the secondary battery 13 and the circuit board 15 as shown in FIG. 2. In other words, the magnetic foil 16 is arranged between the spiral coil 11 and the circuit board 15. In addition, the magnetic foil 16 may be arranged between the spiral coil 11 and the rectifier 12 or between the spiral coil 11 and the electronic device 14. Among the above positions, the magnetic foil 16 is arranged in at least one position. The magnetic foil 16 may be arranged at two or more positions.

Figure 3:
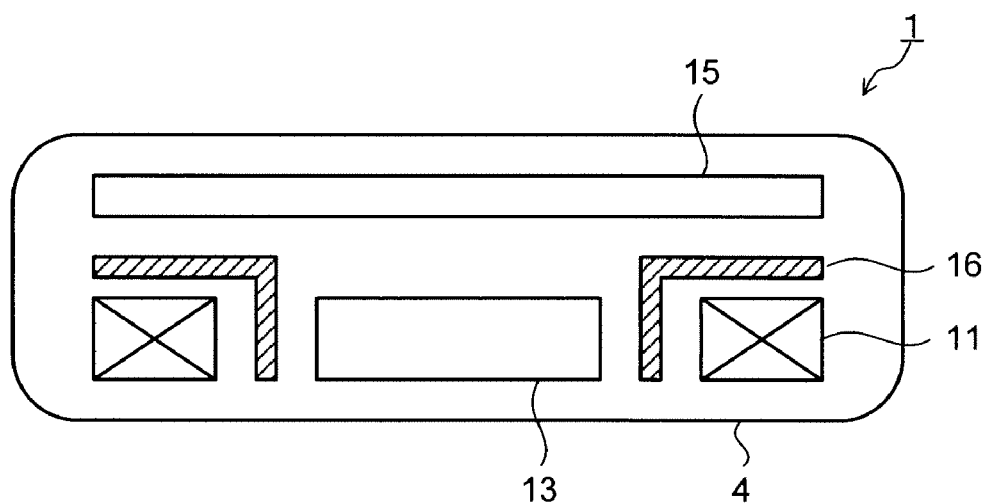
FIG. 3 is a diagram showing a structure of the electronic apparatus according to a second embodiment of the present invention.

FIG. 3 shows an electronic apparatus according to a second embodiment. The electronic apparatus 1 shown in FIG. 3 has the spiral coil 11 disposed around the secondary battery 13. In other words, the secondary battery 13 is disposed in a space provided at the center of the spiral coil 11. The magnetic foil 16 has a shape to protrude near the center so that the protrusion is positioned between the spiral coil 11 and the secondary battery 13 in addition to the presence of the magnetic foil 16 between the spiral coil 11 and the circuit board 15. The rectifier 12 and the electronic device 13 are omitted in FIG. 3.

The electronic apparatus 1 of the second embodiment may also have the magnetic foil 16 arranged between the spiral coil 11 and the circuit board 15, between the spiral coil 11 and the rectifier 12, and between the spiral coil 11 and the electronic device 14. The magnetic foil 16 is arranged in at least one of the above positions. The magnetic foil 16 may be arranged in two or more positions.

To decrease the width of the electronic apparatus 1, the structure according to the first embodiment is preferable. To decrease the thickness of the electronic apparatus 1, the structure according to the second embodiment is preferable. These embodiments are appropriately selected depending on the structure and the like of the electronic apparatus 1 applied. The structure of the electronic apparatus 1 is not limited to those of FIG. 1 through FIG. 3. The arrangement of the spiral coil 11, the secondary battery 13 and the circuit board 15 can be varied in various ways. For example, the secondary battery, the circuit board and the spiral coil may be arranged downwardly in this order. For example, the magnetic foil is disposed between the circuit board and the spiral coil.

In a case where the magnetic foil 16 is arranged between the spiral coil 11 and the circuit board 15, the spiral coil 11/magnetic foil 16/circuit board 15 may be simply stacked or may be fixed with an adhesive or a brazing material. The same is also applied to other cases, and the individual component elements may be stacked simply or may be fixed with an adhesive or a brazing material.

A magnetic flux flowing through the spiral coil 11 when charging can be shielded by the magnetic foil 16 which is arranged in one of the positions between the spiral coil 11 and the secondary battery 13, between the spiral coil 11 and the rectifier 12, between the spiral coil 11 and the electronic device 14, and between the spiral coil 11 and the circuit board 15 as described above. Therefore, the magnetic flux interlinked with the circuit board 15 and the like in the electronic apparatus 1 is decreased, and it becomes possible to prevent the generation of eddy current due to electromagnetic induction. It is preferable that the magnetic foil 16 has a thickness in a range of 5 to 500 μm considering an installation characteristic, a magnetic flux shielding characteristic and the like. The thickness includes the thickness of an insulation layer and a base material when plural magnetic sheets are stacked.

By suppressing the effect of the eddy current, the generation of heat in the electronic device 14 and the rectifier 12 mounted on the circuit board 15, the generation of heat in the circuit of the circuit board 15, and the generation of noise due to the eddy current can be suppressed. The suppression of the generation of heat in the electronic apparatus 1 contributes to improvement of the performance and reliability of the secondary battery 13. Besides, the suppression of the generation of heat due to the eddy current can increase the electric power to be fed to the power receiver 2. Since the magnetic foil 16 also functions as a magnetic core of the spiral coil 11, power reception efficiency and also the charging efficiency can be enhanced. And, they contribute to a decrease of the charging time of the electronic apparatus 1.

For the magnetic foil 16, there is used a magnetic alloy strip (magnetic alloy ribbon), a magnetic sheet which has magnetic particles dispersed into a resin film, a magnetic sheet which has a magnetic thin film formed on a flexible base material such as a resin film, or the like. The magnetic alloy strip may be used as a magnetic sheet by adhering to the flexible base material such as a resin film. To the magnetic foil 16, various types of soft magnetic materials can be applied. Specific structures of the magnetic foil 16 include the following.

The magnetic alloy strip is preferably formed of a Co-based amorphous alloy, an Fe-based amorphous alloy or an Fe-based microcrystalline alloy. Such magnetic materials can be produced by a roll quenching method (single roll or double roll), so that a strip having an average thickness of 50 μm or less can be obtained with ease. The magnetic alloy strip having an average thickness of 50 μm or less is preferable because the bent portion and the open portion described later can be formed easily. The average thickness of 35 μm or less is more preferable in view of workability such as bending or the like. The average thickness is preferably 5 μm or more. The magnetic alloy strip having an average thickness of less than 5 μm tends to have a problem such as a breakage when it is subjected to a bending process.

The amorphous alloy forming the magnetic alloy strip preferably has a composition represented by a general formula:

$$(T_{1-a}M_a)_{100-b}X_b \qquad (1)$$

(wherein, T represents at least one element selected from Co and Fe, M represents at least one element selected from Ni, Mn, Cr, Ti, Zr, Hf, Mo, V, Nb, W, Ta, Cu, Ru, Rh, Pd, Os, Ir, Pt, Re and Sn, X represents at least one element selected from B, Si, C and P, and a and b are numbers satisfying $0 \leq a \leq 0.3$, $10 \leq b \leq 35$ at %). In the formula (1), if the element T contains both Co and Fe, it is called a Co-based amorphous alloy when Co is large in amount and called an Fe-based amorphous alloy when Fe is large in amount.

In the formula (1), the composition ratio of the element T is adjusted depending on the required magnetic properties such as flux density, magnetostriction value, iron loss, and the like. The element M is an element added to control thermal stability, corrosion resistance and crystallization temperature. The added amount of the element M is preferably 0.3 or less as value a. If the added amount of the element M is excessively large, the amount of the element T decreases relatively, so that the magnetic characteristics of the amorphous magnetic alloy strip are lowered. The value a indicating the added amount of the element M is preferably 0.01 or more for practical purposes. The value a is more preferably 0.15 or less.

The element X is an element essential to obtain an amorphous alloy. Especially, B (boron) is an element effective to make a magnetic alloy amorphous. Si (silicon) is an element effective to assist the formation of an amorphous phase and to increase a crystallization temperature. If the content of the element X is excessively large, a magnetic permeability lowers and brittleness is generated, and if it is excessively small, it becomes hard to make it amorphous. Accordingly, the content of the element X is preferably in a range of 10 to 35 at %. The content of the element X is more preferably in a range of 15 to 25 at %.

The Fe-based microcrystalline alloy strip is formed of an Fe-based alloy having a composition substantially represented by a general formula:

$$Fe_{100-c-d-e-f-g-h}A_c D_d E_e Si_f B_g Z_h \qquad (2)$$

(wherein, A represents at least one element selected from Cu and Au, D represents at least one element selected from Ti, Zr, Hf, V, Nb, Ta, Cr, Mo, W, Ni, Co and rare earth elements, E represents at least one element selected from Mn, Al, Ga, Ge, In, Sn and platinum group elements, Z represents at least one element selected from C, N and P, and c, d, e, f, g and h are numbers satisfying $0.01 \leq c \leq 8$ at %, $0.01 \leq d \leq 10$ at %, $0 \leq e \leq 10$ at %, $10 \leq f \leq 25$ at %, $3 \leq g \leq 12$ at % and $15 \leq f+g+$ h≦35 at %) in which 20% or more in an area ratio of the metal texture is comprised of microcrystalline grains having a particle diameter of 50 nm or less.

In the formula (2), the element A is an element which enhances corrosion resistance, prevents coarsening of crystal grains, and improves magnetic characteristics such as iron loss, magnetic permeability and the like. If the content of the element A is excessively small, a sufficient effect of suppression of coarsening of the crystal grains cannot be obtained, and if it is excessively large, the magnetic characteristics are degraded. Therefore, the content of the element A is preferably determined to fall in a range of 0.01 to 8 at %. The element D is an element effective to uniformize the crystal grain diameter, to decrease magnetostriction and the like. The content of the element D is preferably determined to fall in a range of 0.01 to 10 at %.

The element E is an element effective to improve soft magnetic characteristics and corrosion resistance. The content of the element E is preferably 10 at % or less. Si and B are elements to assist in making the alloy amorphous at the time of producing the strip. The content of Si is preferably determined to fall in a range of 10 to 25 at %, and the content of B is preferably determined to fall in a range of 3 to 12 at %. The element Z may be contained as the element of assisting in making the elements other than Si and B amorphous. In such a case, the total content of the elements Si, B and Z is preferably determined to fall in a range of 15 to 35 at %. The microcrystalline structure is preferable to take a mode in which crystal grains having a particle diameter particularly in a range of 5 to 30 nm exist in the alloy with an area ratio of 50 to 90%.

For example, the amorphous alloy strip is produced by a roll quenching method (molten-metal-quenching method). Specifically, it is produced by quenching an alloy material adjusted to have a prescribed composition ratio from its molten state. The microcrystalline alloy strip can be obtained by producing an amorphous alloy strip by, for example, a liquid quenching method and performing heat treatment at a temperature in a range of −50 to +120 degrees C. for one minute to 5 hours against the crystallization temperature to deposit microcrystalline grains. The microcrystalline alloy strip can also be obtained by a method of directly depositing the microcrystalline grains by controlling a quenching rate of the liquid quenching method.

The magnetic alloy strip formed of the amorphous alloy strip or the Fe-based microcrystalline alloy strip is preferable to have an average thickness in a range of 5 to 50 μm. If the average thickness of the magnetic alloy strip exceeds 50 μm, magnetic permeability lowers, and its loss might become large. If the average thickness of the magnetic alloy strip is less than 5 μm, no more effect can be obtained, but the production cost is increased. The thickness of the magnetic alloy strip is more preferably in a range of 5 to 35 μm, and still more preferably in a range of 10 to 25 μm.

In a case where a magnetic sheet having magnetic particles dispersed into a resin film is used as the magnetic foil 16, the magnetic particles used include a metal-based magnetic powder such as a sendust powder (Fe—Si—Al-based magnetic alloy powder), an Fe—Ni-based magnetic alloy powder, an Fe—Cr-based magnetic alloy powder, a Co-based amorphous alloy powder or an Fe-based amorphous alloy powder, or an oxide-based magnetic powder such as a ferrite powder. As a resin in which magnetic particles are dispersed, an epoxy resin, a silicone resin, a polyimide resin, a vinyl chloride resin or the like is used. A vehicle, an inorganic filler such as $SiO_2$ particles or the like may be added, if necessary.

In a case where a magnetic sheet having a magnetic thin film formed on the resin film is used as the magnetic foil 16, a membrane of an Fe—Co-based alloy such as $Fe_{68}Co_{17}Zr_{15}$, a Co—Fe—B-based alloy such as $Co_{35.6}Fe_{50}B_{14.4}$, an Fe—Ni-based alloy or the like is used as the magnetic thin film. Various types of materials indicating soft magnetic can be applied to the magnetic thin film. The magnetic thin film is formed by a sputter method, a deposition method, a CVD method, a plating method or the like. The membrane structure includes amorphous, granular, nanocrystal, heteroamorphous and the like, and is not limited to a particular one. The resin film on which the magnetic thin film is formed includes a polyimide resin, a silicone resin, an epoxy resin and the like. The magnetic foil 16 can be made thin by forming the magnetic thin film on the resin film by the sputter method or the like.

In the magnetic sheet having magnetic particles, the magnetic particles are preferable to have an average particle diameter of 30 μm or less. The average particle diameter indicates an average value of particle diameters of spherical particles having the same volume as the particle volume. A thin magnetic sheet having plasticity can be readily produced by using magnetic particles having an average particle diameter of 30 μm or less. The resin film configuring the magnetic sheet is preferred to have a thickness in a range of 20 to 500 μm. In the magnetic sheet having the magnetic thin film, the magnetic thin film is preferable to have a thickness in a range of 2 to 100 μm. The resin film forming the magnetic thin film is preferable to have a thickness in a range of 5 to 50 μm.

Figure 4:
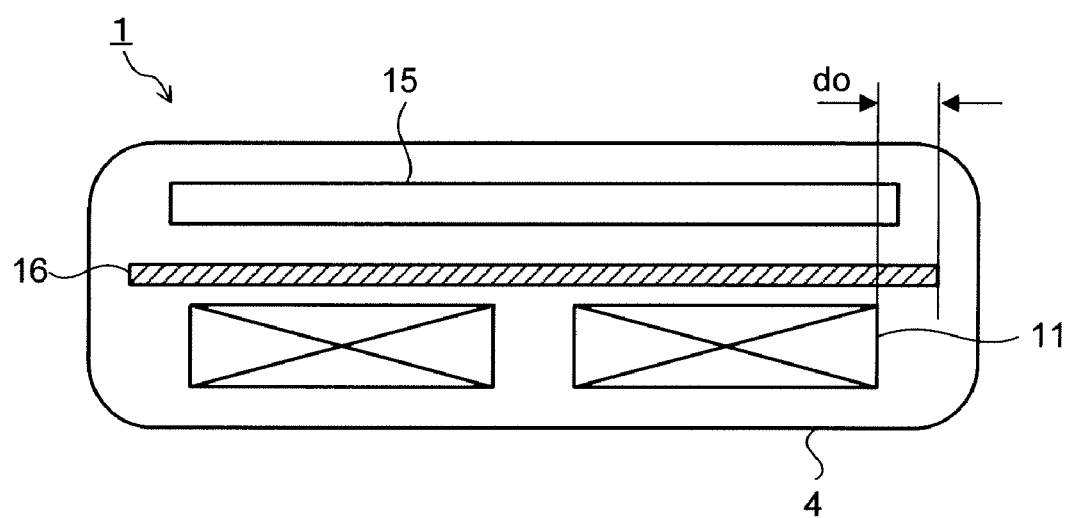
FIG. 4 is a sectional view showing an example of providing a protruded portion on an outer peripheral portion of a magnetic foil according to an embodiment the present invention.

A method and structure for further suppression of a problem due to the eddy current are described below. As shown in FIG. 4, the magnetic foil 16 is preferable to have its outer peripheral edge extended to the outside of the outer peripheral portion of the spiral coil 11. In FIG. 4, do indicates a portion (protruded portion) of the magnetic foil 16 protruded externally from the spiral coil 11. By configuring as described above, the magnetic flux generated in the spiral coil 11 can be blocked more effectively by the magnetic foil 16. It contributes greatly to the suppression of the eddy current based on the magnetic flux interlinked with the board and the like and also to the suppression of the heat generation due to the eddy current and a decrease in the power reception efficiency.

Figure 5:
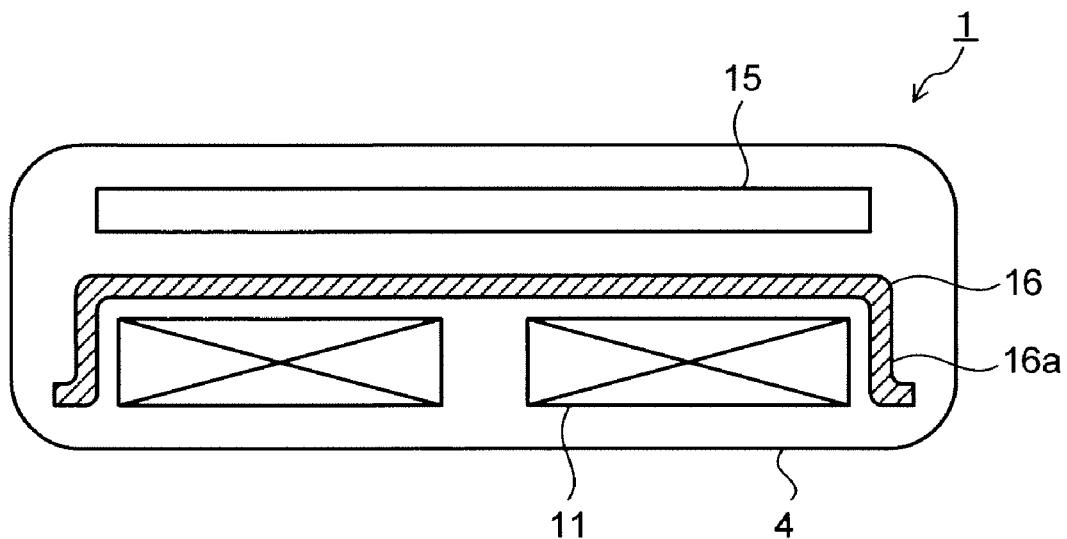
FIG. 5 is a sectional view showing another example of providing a protruded portion on the outer peripheral portion of the magnetic foil according to the embodiment the present invention.
Figure 6:
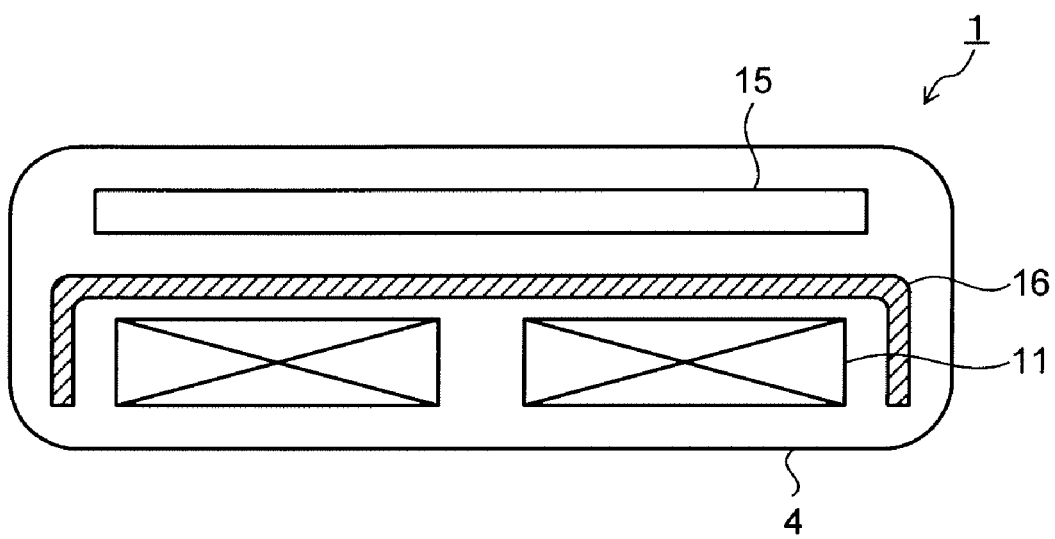
FIG. 6 is a sectional view showing still another example of providing a protruded portion on the outer peripheral portion of the magnetic foil according to the embodiment the present invention.

As shown in FIG. 5 and FIG. 6, the protruded portion do of the magnetic foil 16 may be bent toward the side (on the side of the spiral coil 11) opposite to the circuit board 15. In FIG. 5 and FIG. 6, the magnetic foil 16 has a bent portion 16a which is formed by bending its outer peripheral edge toward the opposite side from the circuit board 15. The bent portion 16a may be bent plural times as shown in FIG. 5 or one time as shown in FIG. 6. The outer peripheral portion of the magnetic foil 16 can be bent toward the spiral coil 11 to further enhance the eddy current suppressing effect.

Besides, the magnetic foil 16 also functions as the magnetic core of the spiral coil 11. In this case, the outer peripheral of the magnetic foil 16 can be bent toward the spiral coil 11 to decrease the gap between the magnetic foil 16 as the magnetic core and the power supplying coil (primary coil). Thus, it becomes possible to enhance the power reception efficiency. At this time, the magnetic foil 16 which is close to the power supplying coil has a greater effect if it has a larger area. Therefore, as shown in FIG. 5, the magnetic circuit can be formed more effectively to enhance the power reception efficiency by directing the outer peripheral edge of the magnetic foil 16 to a direction substantially parallel to the normal of the winding surface of the power supplying coil.

Figure 7:
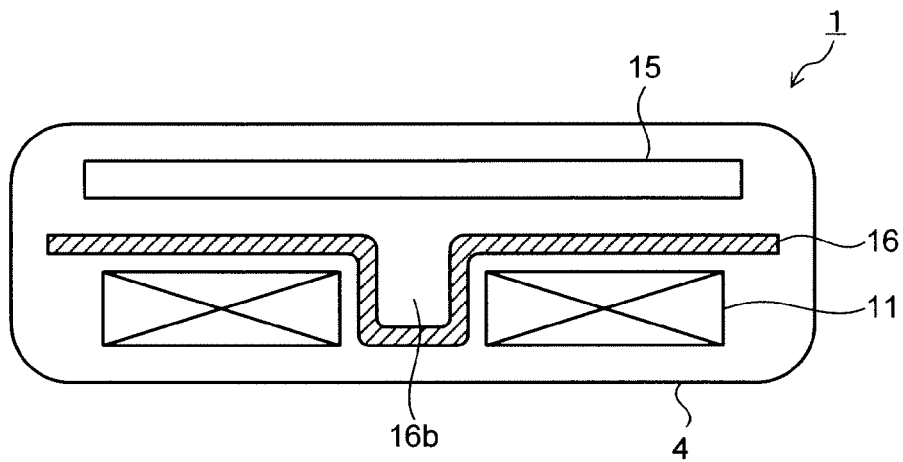
FIG. 7 is a sectional view showing an example of providing an open portion at the center of a magnetic foil according to an embodiment of the present invention.
Figure 8:
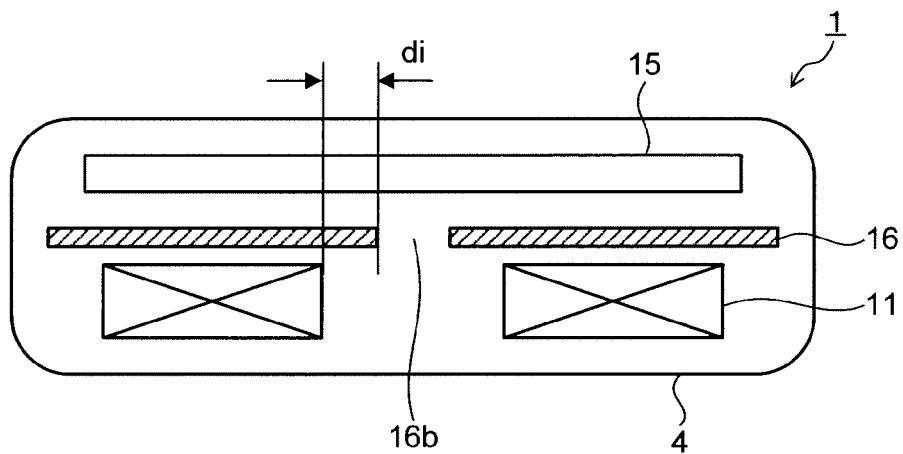
FIG. 8 is a sectional view showing another example of providing an open portion at the center of the magnetic foil according to the embodiment of the present invention.
Figure 9:
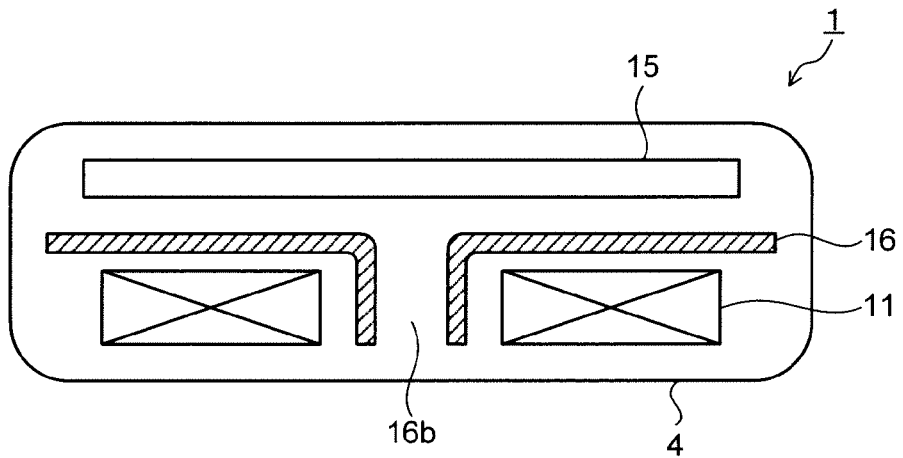
FIG. 9 is a sectional view showing another example of providing an open portion at the center of the magnetic foil according to the embodiment of the present invention.

An open portion 16b may be formed at the center of the magnetic foil 16 as shown in FIG. 7, FIG. 8 and FIG. 9. The open portion 16b of the magnetic foil 16 is provided at a position corresponding to the center of the spiral coil 11. The shape of the open portion 16b includes a shape (downward projected shape) that the center of the magnetic foil 16 is recessed toward the spiral coil 11 as shown in FIG. 7, a shape that a hole is formed in the center of the magnetic foil 16 as shown in FIG. 8, and a shape that the center of the magnetic foil 16 is bent as shown in FIG. 9. The open portion 16b can be formed to decrease the gap against the power supplying coil (primary coil), so that the magnetic circuit can be formed more effectively to enhance the power reception efficiency.

In FIG. 8, di denotes a portion of the magnetic foil 16, which is present inside of the spiral coil 11. The bent portion shown in FIG. 9 is obtained by bending the portion di, which is present inside of the spiral coil 11 of the magnetic foil 16, toward the spiral coil 11. The structure that the outer peripheral portion of the magnetic foil 16 is protruded to the outside of the spiral coil 11 and the structure that the open portion is formed at the center may be used independently or together. Adoption of both of these structures exerts a grater effect of improving the power reception efficiency. In FIG. 4 through FIG. 9, the rectifier 12, the secondary battery 13 and the electronic device 13 are omitted. The same is also applied to FIG. 15.

Besides, it is preferable to provide slits in the magnetic foil 16 in order to suppress the eddy current in the magnetic foil 16. It is more effective to divide the magnetic foil 16 into plural by the slits so as to cut off an electrical path (or a current path). Examples of the magnetic foil 16 provided with the slits are shown in FIG. 10 through FIG. 14. In these drawings, numeral 17 denotes the slits. In a case where the slits 17 cut the magnetic foil 16, they correspond to the dividing lines of the magnetic foil 16.

Figure 10:
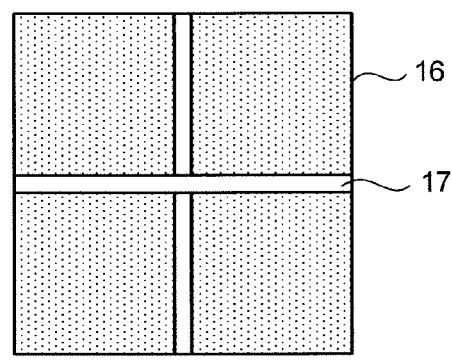
FIG. 10 is a plan view showing an example of forming slits in a magnetic foil according to an embodiment of the present invention.
Figure 11:
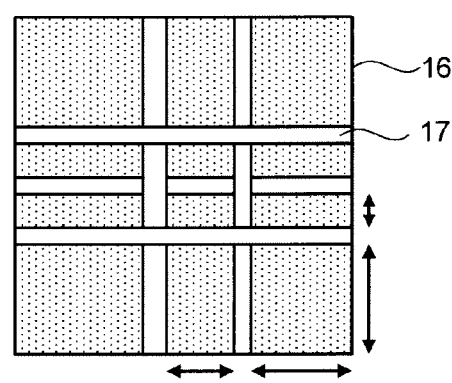
FIG. 11 is a plan view showing another example of forming slits in the magnetic foil according to the embodiment of the present invention.
Figure 12:
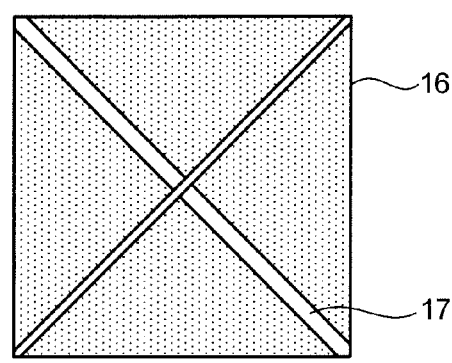
FIG. 12 is a plan view showing still another example of forming slits in the magnetic foil according to the embodiment of the present invention.

FIG. 10 shows a state that the slits 17 are formed vertically and horizontally in the magnetic foil 16 to intersect mutually at right angles. The magnetic foil 16 shown in FIG. 10 is divided into four. FIG. 11 shows a state that the plural slits 17 are formed in the magnetic foil 16 vertically and horizontally. As shown in FIG. 11, in a case where the plural slits 17 are formed, the sizes of the slits 17 and the intervals of the slits 17 are arbitrary. FIG. 12 shows a state that the slits 17 are formed to intersect at right angles in diagonal directions of the magnetic foil 16. Thus, the slits 17 are not limited to be formed horizontally and vertically but may also be formed to have an angle. It is not shown but the slits may be formed radially.

Figure 13:
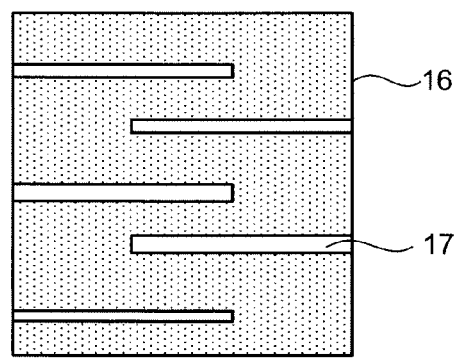
FIG. 13 is a plan view showing still another example of forming slits in the magnetic foil according to the embodiment of the present invention.
Figure 14:
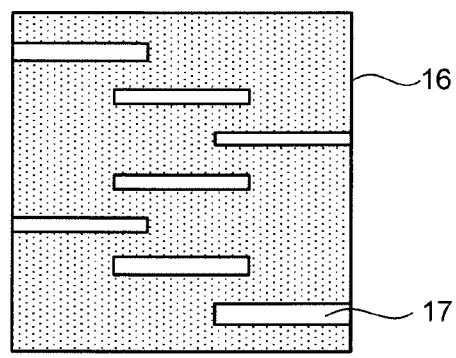
FIG. 14 is a plan view showing still another embodiment of forming slits in the magnetic foil according to the embodiment of the present invention.

FIG. 13 shows a state that the slits 17 are formed from one end to the midpoints of the magnetic foil 16. The slits 17 are formed from both opposed ends to the other ends. FIG. 14 shows a state that the slits 17 are formed from both ends to the midpoints of the magnetic foil 16, and the slits 17 are also formed around the center portions. When the electrical path is cut off, the magnetic flux becomes larger toward the center of the spiral coil 11, so that it is effective to dispose the slits 17 such that the area of the magnetic foil 16 divided becomes smaller toward the center. But, when the number of the slits (division number) is increased, magnetic resistance increases, so that the power reception efficiency is decreased. Therefore, the slits 17 are preferably provided considering both the eddy current suppressing effect and the power reception efficiency.

Figure 15:
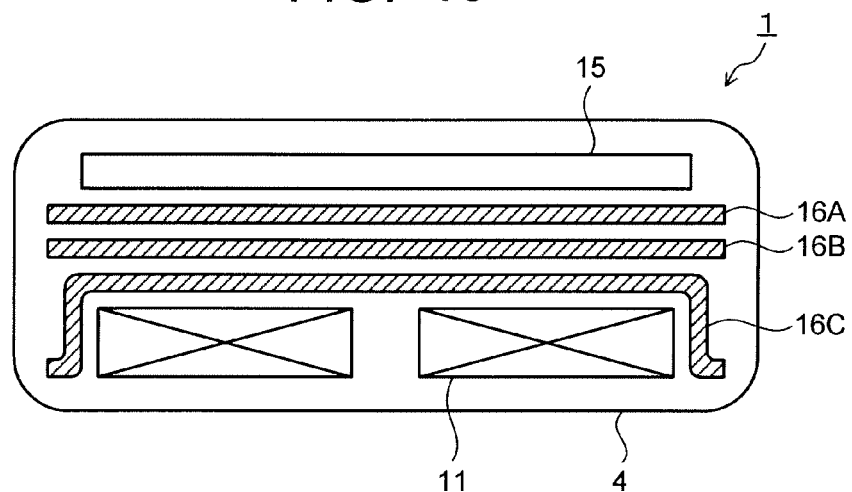
FIG. 15 is a sectional view showing an example of providing plural magnetic foils in an electronic apparatus according to an embodiment of the present invention.

To improve both the eddy current suppressing effect and the power reception efficiency, it is effective to use plural magnetic foils. An example of using plural magnetic foils is shown in FIG. 15. In the electronic apparatus 1 shown in FIG. 15, three magnetic foils 16A, 16B, 16C are disposed between the spiral coil 11 and the circuit board 15. The magnetic foil 16A has the slits 17 shown in FIG. 10. The magnetic foil 16B has the slits 17 shown in FIG. 11. The magnetic foil 16C does not have a slit but has its outer peripheral portion bent.

Thus, the use of both the magnetic foil 16C provided with the bent portion 16a and the magnetic foils 16A, 16B provided with the slits 17 enables to enhance both the eddy current suppressing effect and the power reception efficiency. The magnetic foil 16 provided with the slits 17 may be combined with the magnetic foil 16 provided with the open portion 16b, and the magnetic foil 16 provided with both the bent portion 16a and the open portion 16b may be combined with the magnetic foil 16 having the slits 17. In a case where three or more (n or more) magnetic foils 16 are used, two ((n−1) of them) may be determined as the magnetic foils 16 having the same shape (structure), and all of three (n) magnetic foils 16 may have the same structure.

The above-described power receiver 2 of the embodiment and the electronic apparatus 1 using it can decrease the heat generation within the device and improve the power reception efficiency because the eddy current due to the magnetic flux interlinked with the spiral coil 11 is suppressed. Thus, the electric power at the time of power supplying can be increased, and the charging time can be decreased accordingly. The electronic apparatus 1 of this embodiment is suitable for cellular phones, portable audio devices, digital cameras, video games and the like. The electronic apparatus 1 is set on a power feeder to perform non-contact charging.

Figure 16:
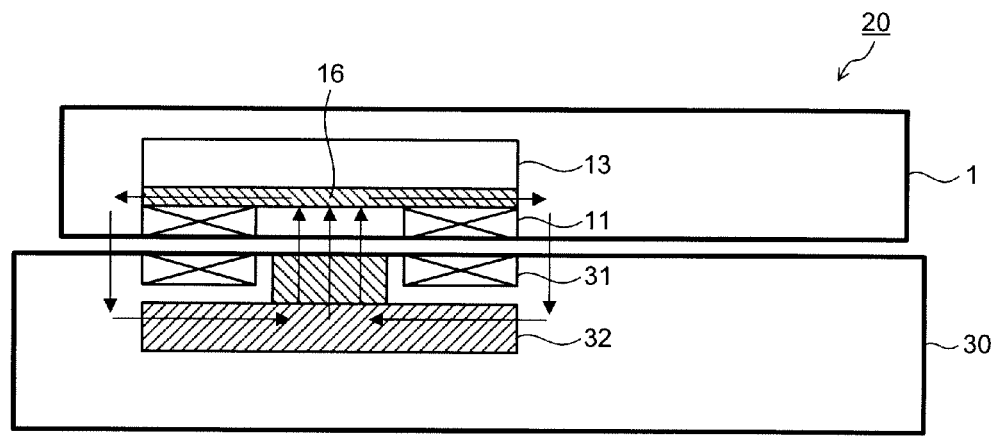
FIG. 16 is a diagram showing a structure of a non-contact charger according to an embodiment of the present invention.
Figure 17:
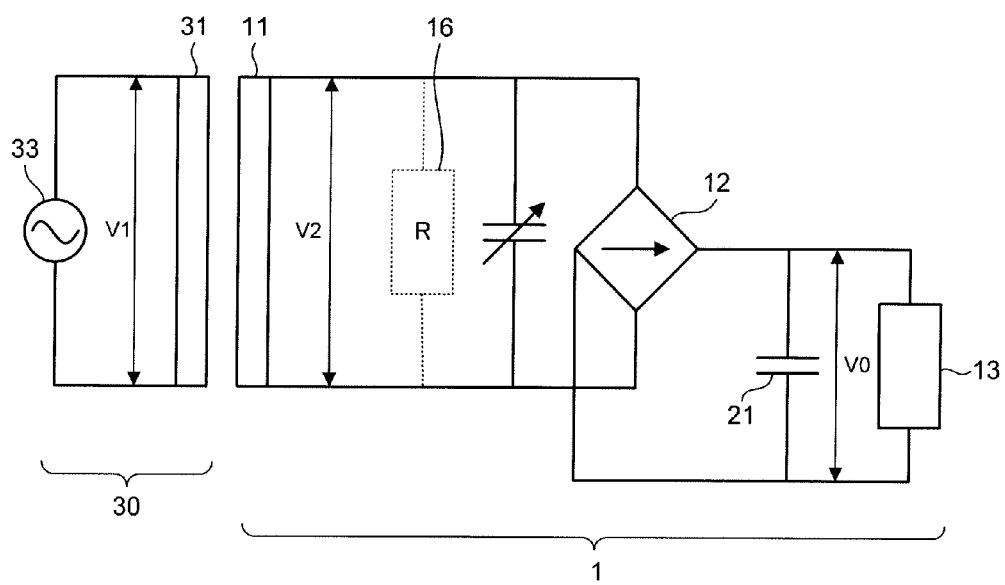
FIG. 17 is a circuit diagram of the non-contact charger shown in FIG. 16.

FIG. 16 shows a structure of a non-contact charger according to an embodiment of the present invention. FIG. 17 is a circuit diagram of the non-contact charger shown in FIG. 16. In a non-contact charger 20 shown in FIG. 16 and FIG. 17, the electronic apparatus 1 is the one described in the above-described embodiment. In FIG. 16, arrows indicate flows of magnetic flux. In FIG. 17, numeral 21 denotes a capacitor for smoothing. A power feeder 30 is provided with a power supplying coil 31, a magnetic core 32 for the power supplying coil and a power supply 33 for applying an AC voltage to the power supplying coil 31. When the electronic apparatus 1 is set on the power feeder 30, the power supplying coil 31 is arranged in no contact with the power receiving coil 11.

Charging is performed by the non-contact charger 20 as follows. First, the AC voltage is applied from the power supply 33 to the power supplying coil 31 of the power feeder 30 to generate magnetic flux in the power supplying coil 31. The magnetic flux generated in the power supplying coil 31 is transmitted to the power receiving coil 11 which is disposed in no contact with the power supplying coil 31. The power receiving coil 11 receives the magnetic flux, and AC voltage is generated by electromagnetic induction. The AC voltage is rectified by the rectifier 12. The AC voltage rectified by the rectifier 12 is charged to the secondary battery 13. Thus, the non-contact charger 20 performs non-contact transmission of power.

Specific examples of the invention and their evaluated results will be described below.

(Charging System)

As a non-contact charging system, a charging system for a cellular phone was prepared. A power feeder has a first coil (power supplying coil), which converts the power from the AC power supply into a prescribed electromagnetic wave through a control circuit and transmits the electromagnetic wave, provided near a cradle. The cellular phone is provided with a secondary coil (power receiving coil) comprising a spiral coil as the power receiver, a circuit board on which a rectifier for rectifying the AC power generated in the secondary coil is mounted, and a secondary battery. The second coil has a copper wire wound in a planar state having an outer periphery of 30 mm and an inner periphery of 23 mm.

Comparative Example 1

For the above-described cellular phone, a magnetic foil was not used to configure the power receiver. The cellular phone and a non-contact charger using the power receiver were determined as Comparative Example 1.

Comparative Example 2

A power receiver was configured in the same manner as in Comparative Example 1 except that a resin substrate with ferrite powder contained in a circuit board was used. A cellular phone and a non-contact charger using the power receiver were determined as Comparative Example 2.

Example 1

As a magnetic foil, an amorphous alloy strip having an average thickness of 15 μm and a composition of $Co_{74}Fe_4Si_8B_{14}$ (atomic ratio) was prepared. A protruded amount of an outer peripheral portion of the amorphous alloy strip was determined to be do=6 mm, and three of the amorphous alloy strips were stacked. The three amorphous alloy strips were disposed between the second coil (power receiving coil 11) and the secondary battery 13 as shown in FIG. 1. A cellular phone and a non-contact charger using a power receiver having the above magnetic foil were determined as Example 1.

Examples 2 to 5

In Example 2, three amorphous alloy strips having the outer peripheral portion with a protruded amount of do=3 mm were stacked. In Example 3, three amorphous alloy strips having do=0 mm were stacked. In Example 4, three amorphous alloy strips having the outer peripheral portion with a protruded amount of do=−3 mm were stacked. In Example 5, a single amorphous alloy strip having the outer peripheral portion with a protruded amount of do=6 mm was used. Those amorphous alloy strips were disposed between the second coil (power receiving coil 11) and the circuit board 15 in the same manner as in Example 1 to configure the power receivers. Cellular phones and non-contact chargers using the above power receivers were determined as Examples 2 to 5.

Example 6

The protruded portion (do=6 mm) of the same amorphous alloy strip as in Example 1 was bent to form a bent portion as shown in FIG. 5. Three of such amorphous alloy strips were stacked and disposed between the second coil (power receiving coil 11) and the circuit board 15 in the same manner as in Example 1 to configure the power receiver. A cellular phone and a non-contact charger using the above power receiver were determined as Example 6.

Example 7

Sendust powder having an average particle diameter of 20 μm was dispersed into a silicone resin so to have a volume occupancy of 50%, and the resin was formed into a sheet having a thickness of 50 μm. The power receiver was configured in the same manner as in Example 6 except that the magnetic sheet was used as a magnetic foil. A cellular phone and a non-contact charger using the above power receiver were determined as Example 7.

Example 8

An $SiO_2$ film and a Ti film were sequentially formed on a polyimide film having a thickness of 25 μm by a sputter method. Then, an $Fe_{68}Co_{17}Zr_{15}$ (atomic ratio) composition sputter target and an $SiO_2$ target were used to form a magnetic thin film by an RF sputter method, and an $SiO_2$ film was further formed on it. The magnetic thin film and the $SiO_2$ film were formed four times. The formed film had a structure $[SiO_2(0.05)/FeCoZrSiO(0.5)]×4/Ti(0.01)/SiO_2(0.03)/$polyimide film $(25)/SiO_2(0.03)/Ti(0.01)/[FeCoZrSiO (0.5)/SiO_2 (0.05)]×4$. Numerals in parentheses indicate thickness (μm).

The above-described film forming process was conducted on both sides of the polyimide film to produce the magnetic sheet. The power receiver was configured by the same manner as in Example 6 except that the magnetic sheet was used as a magnetic foil. A cellular phone and a non-contact charger using the above power receiver were determined as Example 8.

Example 9

The open portion shown in FIG. 7 was formed at the center of the magnetic sheet having the same structure as that in Example 8. The power receiver was configured in the same manner as in Example 8 excepting that the obtained magnetic sheet was used as a magnetic foil. A cellular phone and a non-contact charger using the above power receiver were determined as Example 9.

Example 10

The open portion shown in FIG. 8 was formed at the center of the magnetic sheet having the same structure as that in Example 8. The center portion had a protruded amount of di=3 mm. The power receiver was configured in the same manner as in Example 8 excepting that the obtained magnetic sheet was used as a magnetic foil. A cellular phone and a non-contact charger using the above power receiver were determined as Example 9.

Example 11

The power receiver was configured in the same manner as in Example 8 excepting that the center of the magnetic sheet of Example 10 was determined to have a protruded amount of di=0 mm. A cellular phone and a non-contact charger using the obtained power receiver were determined as Example 11.

Example 12

The power receiver was configured in the same manner as in Example 8 excepting that the center of the magnetic sheet of Example 10 was determined to have a protruded amount of di=−3 mm. A cellular phone and a non-contact charger using the obtained power receiver were determined as Example 12.

Example 13

The protruded portion (di=3 mm) at the center of the magnetic sheet of Example 10 was bent as shown in FIG. 9. The power receiver was configured in the same manner as in Example 8 excepting that the obtained magnetic sheet was used as a magnetic foil. A cellular phone and a non-contact charger using the obtained power receiver were determined as Example 13.

Example 14

As shown in FIG. 10, a slit one each was formed vertically and horizontally on the magnetic sheet having the same structure as that of Example 8. The slit was determined to have a width of 100 μm. The power receiver was configured in the same manner as in Example 8 excepting that the magnetic sheet having the slits was used as a magnetic foil. A cellular phone and a non-contact charger using the obtained power receiver were determined as Example 14.

Example 15

As shown in FIG. 11, plural slits were formed vertically and horizontally on the magnetic sheet having the same structure as that of Example 8. The slits were determined to have a smaller cycle (forming pitch) toward the center of the sheet. The slit width was determined to be in a range of 50 to 1000 μm. The power receiver was configured in the same manner as in Example 8 excepting that the magnetic sheet having the slits was used as a magnetic foil. A cellular phone and a non-contact charger using the obtained power receiver were determined as Example 15.

Example 16

Plural slits were radially formed on the magnetic sheet having the same structure as that in Example 8. The power receiver was configured in the same manner as in Example 8 excepting that the obtained magnetic sheet was used as a magnetic foil. A cellular phone and a non-contact charger using the obtained power receiver were determined as Example 16.

Example 17

As shown in FIG. 13, plural slits were formed from ends to midpoints of a foil as the magnetic sheet configured in the same manner as in Example 8. The power receiver was configured in the same manner as in Example 8 excepting that the magnetic sheet having the slits was used as a magnetic foil. A cellular phone and a non-contact charger using the obtained power receiver were determined as Example 17.

Example 18

Both the slits from the ends to midpoints of the foil and the independent slits formed in plural as shown in FIG. 14 were formed on the magnetic sheet configured in the same manner as in Example 8. The power receiver was configured in the same manner as in Example 8 excepting that the magnetic sheet having such slits was used as a magnetic foil. A cellular phone and a non-contact charger using the obtained power receiver were determined as Example 18.

Example 19

Among the three amorphous alloy strips used in Example 1, two of them were used as they were, and the remaining one was formed to have a bent portion by bending the outer peripheral portion (see FIG. 15). The power receiver was configured in the same manner as in Example 1 excepting that the three amorphous alloy strips were used. A cellular phone and a non-contact charger using the obtained power receiver were determined as Example 19.

Example 20

As shown in FIG. 3, the spiral coil was provided around the secondary battery. Besides, three amorphous alloy strips having the same structure as in Example 1 were bent and disposed between the spiral coil and the circuit board and between the spiral coil and the secondary battery as shown in FIG. 3. The power receiver was configured in the same manner as in Example 1 excepting that the obtained amorphous alloy strips were used. A cellular phone and a non-contact charger using the obtained power receiver were determined as Example 20.

The structures of Examples 1 to 20 and Comparative Examples 1 to 2 are shown together in Table 1. And, a power reception efficiency, a heating value and thickness/flexibility of each of Examples and Comparative Examples were measured and evaluated. The results are shown in Table 2. The power reception efficiency was determined based on the charging time of Comparative Example 1 taken as 100 and indicated by (D) when the improvement of the charging time could not be confirmed in comparison with Comparative Example 1, (C) when the charging time was decreased in a range of less than 10%, (B) when the charging time was decreased in a range of 10% or more and less than 50%, and (A) when the charging time was decreased in a range of 50% or more. When the charging time was measured, the power of the power supplying side was maintained constant.

The heating value was determined based on the heating value of Comparative Example 1 taken as 100 and indicated by (D) when the improvement of heat loss could not be confirmed, (C) when the improvement of heat loss was less than 5%, (B) when the improvement of heat loss was 5% or more and less than 20%, and (A) when the improvement of heat loss was 20% or more. The heating value was measured when the charging efficiency was measured. In other words, the heating value was determined when the power was increased to such a level that a problem was not caused by the eddy current. For the thickness/flexibility, it was determined whether the magnetic foil and the magnetic substrate can be decreased to a thickness of 50 μm or less and whether the arrangement of the individual parts such as the circuit board and the secondary battery is not limited. The thickness/flexibility was indicated by (A) when thinning was possible and the arrangement of the parts was not limited, and (B) when either one or both of them were limited.

TABLE 1

|  | Magnetic foil | | do | di |
|---|---|---|---|---|
|  | Type | Shape | [mm] | [mm] |
| Example 1 | Co-based amorphous (15 μm × 3 layers) | Planar shape | 6 | (Continuous) |
| Example 2 | Co-based amorphous (15 μm × 3 layers) | " | 3 | (Continuous) |
| Example 3 | Co-based amorphous (15 μm × 3 layers) | " | 0 | (Continuous) |

TABLE 1-continued

|  | Magnetic foil | | do | di |
|---|---|---|---|---|
|  | Type | Shape | [mm] | [mm] |
| Example 4 | Co-based amorphous (15 μm × 3 layers) | " | −3 | (Continuous) |
| Example 5 | Co-based amorphous (15 μm × 1 layer) | " | 6 | (Continuous) |
| Example 6 | Co-based amorphous (15 μm × 3 layers) | Bent outer peripheral edge | 6 | (Continuous) |
| Example 7 | Fine particle sheet (50 μm) | Bent outer peripheral edge | 6 | (Continuous) |
| Example 8 | Sputter CoZrNb film (25 μm polyimide sheet) | Bent outer peripheral edge | 6 | (Continuous) |
| Example 9 | Sputter CoZrNb film (25 μm polyimide sheet) | Bent center portion | 6 | (Continuous) |
| Example 10 | Sputter CoZrNb film (25 μm polyimide sheet) | Open center portion | 6 | 3 |
| Example 11 | Sputter CoZrNb film (25 μm polyimide sheet) | " | 6 | 0 |
| Example 12 | Sputter CoZrNb film (25 μm polyimide sheet) | " | 6 | −3 |
| Example 13 | Sputter CoZrNb film (25 μm polyimide sheet) | Open center portion/ Bending | 6 | 3 |
| Example 14 | Sputter CoZrNb film (25 μm polyimide sheet) | Slits | 6 | (Continuous) |
| Example 15 | Sputter CoZrNb film (25 μm polyimide sheet) | Slits (Cycle variation) | 6 | (Continuous) |
| Example 16 | Sputter CoZrNb film (25 μm polyimide sheet) | Slits (Radial) | 6 | (Continuous) |
| Example 17 | Sputter CoZrNb film (25 μm polyimide sheet) | Slits (Snicked) | 6 | (Continuous) |
| Example 18 | Sputter CoZrNb film (25 μm polyimide sheet) | Slits (Independently snicked) | 6 | (Continuous) |
| Example 19 | Co-based amorphous (15 μm × 3 layers) | Two planes/one bent outer periphery | 6 | (Continuous) |
| Example 20 | Co-based amorphous (15 μm × 3 layers) | Bending | 6 | (Continuous) |
| Comparative Example 1 | (No magnetic foil) | | | |
| Comparative Example 2 | (Magnetic substrate used as substrate) | | | |

TABLE 2

|  | Electric power receiving efficiency | Heating value | Thickness/ flexibility |
|---|---|---|---|
| Example 1 | A | B | A |
| Example 2 | B | B | A |
| Example 3 | B | B | A |
| Example 4 | C | B | A |
| Example 5 | C | B | A |
| Example 6 | A | B | A |
| Example 7 | A | B | A |
| Example 8 | B | B | A |
| Example 9 | A | B | A |
| Example 10 | B | B | A |
| Example 11 | C | B | A |
| Example 12 | D | B | A |
| Example 13 | B | B | A |
| Example 14 | B | B | A |
| Example 15 | B | A | A |
| Example 16 | B | A | A |
| Example 17 | B | B | A |
| Example 18 | B | A | A |
| Example 19 | A | A | A |
| Example 20 | A | B | A |
| Comparative Example 1 | — | — | A |
| Comparative Example 2 | B | D | B |

It is apparent from Table 2 that the magnetic foil can be arranged to suppress the heating value, and it becomes possible to enhance the power reception efficiency. Besides, when the outer peripheral portion of the magnetic foil is provided with a protruded portion, the protruded portion is provided with a bent portion, or an open portion is formed at the center of the magnetic foil, the heating value suppressing effect and the power reception efficiency improving effect can be further enhanced. It is also effective to form the slits in the magnetic foil. The effects can be improved by combining the above measures.

The present invention is not limited to the above-described embodiments but can be modified in various ways in practical stages without departing from the spirit and scope of the invention. The individual embodiments can be performed in appropriate combinations within a feasible range, and the effects based on the combination can be obtained accordingly. Besides, the above-described embodiments include the inventions in the various stages, and various inventions can be extracted by appropriately combining the disclosed plural composing requirements.

INDUSTRIAL APPLICABILITY

The power receiver and the electronic apparatus according to an embodiment of the present invention has a magnetic foil arranged in at least one position between a spiral coil and a secondary battery, a rectifier, an electronic device or a circuit board to suppress generation of eddy current due to electromagnetic induction. Thus, it becomes possible to suppress heat generation, noise generation, a decrease in power reception efficiency due to the eddy current. The power receiver and the electronic apparatus are effectively used for various types of electronic apparatuses applying non-contact charging.

What is claimed is:

1. A power receiver, comprising:
a power receiving coil having a planar spiral coil;
a rectifier for rectifying an AC voltage generated in the power receiving coil;
a secondary battery to which a DC voltage rectified by the rectifier is charged; and
a flexible magnetic foil arranged in at least one position between the planar spiral coil and the secondary battery and between the planar spiral coil and the rectifier,
wherein the flexible magnetic foil comprises a laminate including a plurality of magnetic alloy thin strips laminated directly or through an insulation layer,
wherein each of the magnetic alloy thin strips is formed of an amorphous alloy or an Fe-based microcrystalline alloy, and has an average thickness in a range of 5 to 50 μm, and
wherein a thickness of the laminate is in a range of 500 μm or less, and the thickness of the laminate contains a thickness of the insulation layer when the plural magnetic alloy thin strips are laminated through the insulation layer.

2. The power receiver according to claim 1,
wherein an outer peripheral edge of the magnetic foil is extended to an outside of an outer peripheral portion of the spiral coil.

3. The power receiver according to claim 1,
wherein the magnetic foil has an open portion formed in a position corresponding to a center of the spiral coil.

4. The power receiver according to claim 1,
wherein the magnetic foil has a slit.

5. The power receiver according to claim 1,
wherein the magnetic foil is divided into plural portions.

6. An electronic apparatus, comprising:
a power receiver which is provided with a power receiving coil having a planar spiral coil, a rectifier for rectifying an AC voltage generated in the power receiving coil, and a secondary battery to which a DC voltage rectified by the rectifier is charged;
an electronic apparatus main body which is provided with an electronic device operated by the DC voltage supplied from the secondary battery and a circuit board on which the electronic device is mounted; and
a flexible magnetic foil arranged in at least one position between the planar spiral coil and the secondary battery, between the planar spiral coil and the rectifier, between the planar spiral coil and the electronic device; and between the planar spiral coil and the circuit board,
wherein the flexible magnetic foil comprises a laminate including a plurality of magnetic alloy thin strips laminated directly or through an insulation layer,
wherein each the magnetic alloy thin strips is formed of an amorphous alloy or an Fe-based microcrystalline alloy, and has an average thickness in a range of 5 to 50 μm, and
wherein a thickness of the laminate is in a range of 500 μm or less, and the thickness of the laminate contains a thickness of the insulation-layer when the plural magnetic alloy thin strips are laminated through the insulation layer.

7. The electronic apparatus according to claim 6,
wherein the magnetic foil is arranged between the spiral coil and the circuit board.

8. The electronic apparatus according to claim 6,
wherein the spiral coil is arranged around the secondary battery, and the magnetic foil is arranged between the spiral coil and the circuit board.

9. The electronic apparatus according to claim 6,
wherein the magnetic foil has a bent portion which is formed by bending an outer peripheral edge of the magnetic foil in a direction opposite to the circuit board.

10. The electronic apparatus according to claim 6,
wherein an outer peripheral edge of the magnetic foals extended to an outside of an outer, peripheral portion of the spiral coil.

11. The electronic apparatus according to claim 6;
wherein the magnetic foil has an open portion formed in a position corresponding to a center of the spiral coil.

12. The electronic apparatus according to claim 6,
wherein the magnetic foil has a slit.

13. The electronic apparatus according to claim 6,
wherein the magnetic foil is divided into plural portions.

14. A non-contact charger, comprising:
the electronic apparatus according to claim 6; and
a power feeder which is provided with a power supplying coil disposed in non-contact with the power receiving coil of the electronic apparatus, and a power supply for supplying an AC voltage to the power supplying coil,
wherein a magnetic flux generated in the power supplying coil is transmitted to the power receiving coil to transmit electric power in a non-contact state.

15. The power receiver according to claim 1,
wherein the magnetic alloy thin strip is produced by quenching a melted alloy.

16. The electronic apparatus according to claim 6,
wherein the magnetic alloy thin strip is produced by quenching a melted alloy.

* * * * *